Sept. 26, 1967 P. C. KUEHN 3,343,637
FRICTION CLUTCH MECHANISM
Filed Dec. 15, 1965
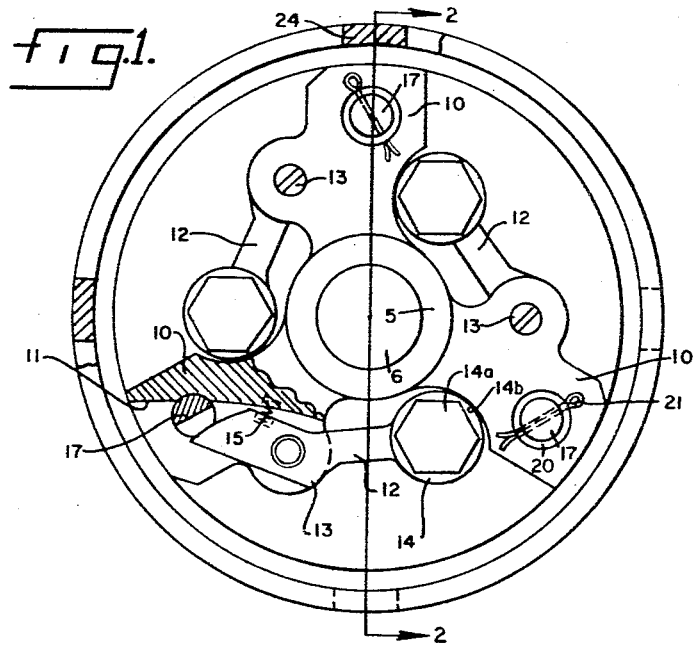
INVENTOR
PAUL C. KUEHN
BY
Parker & Carter
ATTORNEYS

United States Patent Office 3,343,637
Patented Sept. 26, 1967

3,343,637
FRICTION CLUTCH MECHANISM
Paul Christian Kuehn, Box 189, Kendallville, Ind. 46755
Filed Dec. 15, 1965, Ser. No. 513,923
8 Claims. (Cl. 192—105)

This invention relates to a mechanism for a friction clutch, and particularly to an improvement over the mechanisms shown in my issued Patents Nos. 2,696,898 and 2,859,847.

My invention is concerned with a useful improvement in a centrifugally engaged friction clutch mechanism which is adapted for transmitting power from a driving shaft to a driven shaft of similar member. In such a clutch, a power transmitting member is rotatably mounted and is usually mounted on the drive shaft so that a friction plate mounted on the drive shaft may be automatically moved axially to engage a power transmitting member to effect rotation in unison with the drive shaft. Such axial movement is brought about by the action of centrifugally movable members which move in response to centrifugal action upon the drive shaft at predetermined speeds. The centrifugal members may be termed fly levers, and in moving into operative position they engage a cam surface of a thrust member which then thrusts the clutch plate into engagement with the power transmitting member. When the rotation of the shaft falls below a predetermined rate then means associated with the thrust members urge such members to disengage the clutch. It is required that the clutch disengage smoothly in different operations such as when the load is increased beyond the torque power of the drive shaft so that the prime mover, such as an engine, is not stalled. It is also desirable that such a clutch mechanism be smoothly engaged and disengaged so as to be substantially free from shock. It is likewise desired that sensitivity be built into the mechanisms so that said clutch can be quickly disengaged in response to a relatively small change in the rotational rate or r.p.m. of the drive shaft.

It is a primary object of this invention to provide a clutch mechanism in which binding action is substantially eliminated between clutch engaging and disengaging means in response to rotational changes.

It is another object of this invention to provide a mechanism for a friction clutch with improved thrust members which, in combination, permit centrifugal levers to engage and disengage in the different operating conditions with little or no binding therebetween.

It is another object of this invention to provide a new and improved clutch mechanism employing centrifugal levers and thrust members which move a clutch plate into engagement with a frictional clutch substantially free of shock, and which thrust members are disposed so there is little or no drag between the clutch members during changes in rotational speed.

Another object is a clutch mechanism in which centrifugal levers may be smoothly and quickly disengaged from thrust members to permit free wheeling under conditions such as overload.

I have attained the foregoing objects as well as other objects which will become apparent in the following disclosure which includes drawings wherein:

FIGURE 1 is an end elevational view with parts broken away and parts shown in sections;

FIGURE 2 is a sectional view taken on line 2—2 of FIGURE 1;

FIGURE 3 is a side elevational view of a thrust member used in the mechanism; and FIGURE 4 is a top plan of the thrust member shown in FIGURE 3.

Reference may be made to my prior U.S. Patents 2,696,898 and 2,859,847 for additional details of the clutch mechanism, if desired. To illustrate my present improvement, I will refer to the following features disclosed in FIGURES 1 and 2. A drive head 5 is shown fixedly mounted on a drive shaft 6 which may be driven by any suitable source of power or prime mover such as an internal combustion engine. The key 7 serves to secure the hub 8 of the drive head 5 under shaft 6 so that the drive head and drive shaft rotate together. A set screw (not shown) is preferably threaded into the hub 8 so it may bear against the key 7 to prevent axial movement of the hub on the shaft.

The drive head 5 is preferably provided with equally spaced apart extending arms such as 10. The outer ends of such arms are shown provided with slots 11 which are adapted to receive one end of the fly levers such as 12. Each of the fly levers is pivotally mounted on the arms 10 by means of a pivot pin 13. At the outer end of each of these levers is a weight consisting of a number of washers 14 held in position by the screw 14a which is threaded into the levers. The weight may be desirably varied by simply increasing and reducing a number of washers. It is required that a plurality of such fly levers be provided in the mechanism. The minimum and preferred number is 3 which will obtain desired balance in the step of actuating the mechanism. The ends of the lever are preferably tapered about 45° as at 15a to provide better contact with the studs.

FIGURE 1 shows the fly lever out of engagement or in inoperative position. The weight 14 is shown positioned in a recess 14b which is formed in the opposed edge of the adjacent arm 10. This recess limits the inward swinging of the weight at the end of the lever. The levers 12 are urged to nonengaging or inoperative position by springs such as 15, one of which is located in each of the arms 10.

Concentric with the drive head 5 is an annulus which constitutes a clutch plate 16. A plurality of studs such as 17 are secured to the clutch plate and extend loosely through the corresponding arms 10 and through the slots 11 so that a portion of a stud is exposed in each slot. Each stud has disposed about its outer end portion a compression spring 18, one end of which is seated in the socket 19 in the face of the corresponding arm 10. The opposite end of the spring is held in place on the stud by a washer 20 and a pin 21. Through the action of the springs 18 the clutch plate 16 is normally held out of engagement with a part which is adapted to be engaged by said clutch plate.

The part which is adapted to be engaged comprises a portion of a transmitting member 24. The ball bearing 23 is shown embracing the hub 8 of the drive head, and mounted on this ball bearing is the drive member or power transmitting member 24. An annular groove 25 is shown provided on the member to serve as a pulley to receive a belt. The portion of the driven member 24 which is adapted to be engaged by the clutch plate is a plurality of friction plates such as 27. A thrust bearing 28 is shown extending loosely into the driven member and threaded to the drive head as indicated. A key screw 29 is shown securing the bearing to the drive head in adjustable position. The inner end of the thrust bearing 28 bears against a bearing 23 so that the outward axial movement of the driven member on the hub is prevented.

Looking at FIGURES 3 and 4, I show the thrust member or studs 17 as having a notch indicated generally at 30. The notch has an intermediate or back wall 31, a cam surface 22 at one end or lower end, and an inclined wall 32 at the other or upper end of the notch. The cam surface 22 is inclined towards the longitudinal axis of the stud. The cam surface is also inclined relative to the transverse axis of the stud and this inclination is indicated by line 22a which joins the back wall. Looking at it another way, junction line 22a is offset from a position which would be normal to the longitudinal axis of the stud, and is further characterized by high point 22b and a low point 22c. The other end of the notch has the end wall 32 which is inclined in only one direction, that is, relative to a tranverse axis of the stud. The junction line between wall 32 and back wall 31 is inclined in substantially the same manner as junction line 22a so that said junction lines are substantially parallel to each other. The inclination of this top wall of the notch is clearly seen in FIGURES 3 and 4. Wall 32 has high point corresponding to high point 22c and a low point corresponding to low point 22b in the parallel relationship with junction line 22a.

The use, operation and function of my invention are as follows:

In the manner which is now known in the art, rotation of the drive shaft will result in centrifugal levers 12 swinging outwardly so that end 15a of the levers will enter the notch, engage the cam surface, and move the thrust members or studs downwardly or to the left as indicated in FIGURE 2. When rotational speed of the drive shaft or rotatable member decreases, the lever end 15a will be disengaged from the cam surface 22 and the clutch will be biased to the right in FIGURE 2, or to an inoperative position under the urging of the springs 18. This engagement and disengagement of the centrifugal lever with the thrust members is accomplished with little or no shock as a result of the coacting means between the end of the lever and the notch in the thrust members. The relationship of the respective means leads to a coaction which reduces or eliminates binding between the end of the centrifugal levers and the thrust members. This reduced binding is important to quickly disengage and provide "free wheeling" of the mechanism in conditions such as overload to prevent engine stall.

When the end 15a of the lever begins its engagement with the thrust member, the point of engagement is over a limited area because of the double incline of cam surface 22. In fact this point of engagement can be considered as occurring at essentially a single point. Further movement of this centrifugal lever will occur along the cam surface 22 until the centrifugal levers are fully extended under force of centrifugal action. At such full extension, the weights 14 will lie generally along a circumferential line which intersects the thrust members spaced on the radial arms. When the clutch plate 16 is moved into engagement with the frictional plate 27, there is no binding between the end of the centrifugal levers and the notch. Any possible binding which might have occurred is prevented by the inclination in the single direction of wall 32. The side of the lever towards wall 32 will likewise make contact essentially at a single point to prevent any such undesirable binding action.

It is preferred that the end of the lever 15a be tapered along substantially a 45° angle as shown to provide a good contact engagement in the notch of the thrust member. It is further required that the intermediate wall of the notch forms what may be called an "outside angle" relative to a radius from the center of the drive head. This is the angle formed between the intermediate wall 31 and the given radius. There is no critical angle which is required except that it be a substantially acute angle. By this term I mean an angle of about 1° to 15°, the illustration of FIGURE 1 intending to represent an angle of about 15°. The angle is "outside" in the sense that the intermediate wall is directed towards the periphery of the drive head rather than towards the center. I can give this concept another term by calling the preferred angle a positive angle rather than a negative angle. If the thrust member illustrated in FIGURE 1 were rotated so that the back wall would be the angle which is shown, but on the other side of the radius, then the angle could be said to be an inside angle or a negative angle.

It is likewise required that the weight 14 be overcenter as shown on one end of the lever and not off center since this will detract from the desired operation of the lever.

Due to the single point contacts of the cam surface and the inclined wall of the notch, a sensitive and quick operating action is obtained. The quick and sensitive disengagement will tend to eliminate the slipping or drag of the clutch during a period before the clutch actually disengages.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In a clutch mechanism having a drive head rotatably mounted on a drive shaft, said drive head adapted to be axially moved to engage a friction plate on a hub rotatably associated with said drive shaft, said drive head having a plurality of centrifugal levers adapted to actuate studs which are axially movable in the drive head to urge said clutch plate into engagement with said friction plate, the improvements which include:

a notch in each stud,
each notch characterized by an intermediate wall spacing a transverse wall at one end and a cam surface at the other end, said cam surface inclined in two different directions, a first direction inclined to the longitudinal axis of the stud and a second direction inclined to the transverse axis of the stud, said spaced transverse wall further inclined to the transverse axis of the stud in substantially the same manner as the transverse incline of the cam surface so that said transverse incline of the cam surface is substantially parallel to the transverse incline of the wall.

2. The improvements to the clutch mechanism as in claim 1 further characterized in that the transverse incline of said cam surface is coincidental with the intermediate wall.

3. The improvements to the clutch mechanism of claim 1 further characterized in that said transverse incline of the cam surface and said transverse incline of the transverse wall are both generally in the order of about 2° relative to a transverse axis of said stud.

4. The improvements to the clutch mechanism of claim 1 further characterized in that a plurality of such studs are distributed in the drive head and the intermediate walls of each of such studs are disposed at an outside angle relative to a radius of said drive head.

5. The improvements to the clutch mechanism of claim 4 further characterized in that the outside angles of said intermediate walls are from about 1 to about 15° relative to the radius of said drive head.

6. The improvements to the clutch mechanisms of claim 1 further characterized in that the ends of the centrifugal levers which are adapted to engage the cam surfaces are tapered about 45°.

7. The improvements to the clutch mechanism of claim 1 further characterized in that the centrifugal levers effectuate an engageable contact with said cam surfaces when the levers swing out to a point substantially along a circumferential line tangent to the outer periphery of the studs.

8. The improvements to the clutch mechanism of claim 4 further characterized in that the drive head has three studs spaced substantially at an equal distance along a circumferential line substantially coincidental with each of said studs.

References Cited

UNITED STATES PATENTS

| 1,670,877 | 5/1928 | Bruckmann | 192—105 |
| 2,491,003 | 12/1949 | Elmore | 192—105 |

CARLTON R. CROYLE, *Primary Examiner.*

A. T. McKEON, *Assistant Examiner.*